May 7, 1946. H. F. GILCH 2,399,864
HOLLOW AXLE TESTING DEVICE
Filed June 30, 1944 2 Sheets-Sheet 2
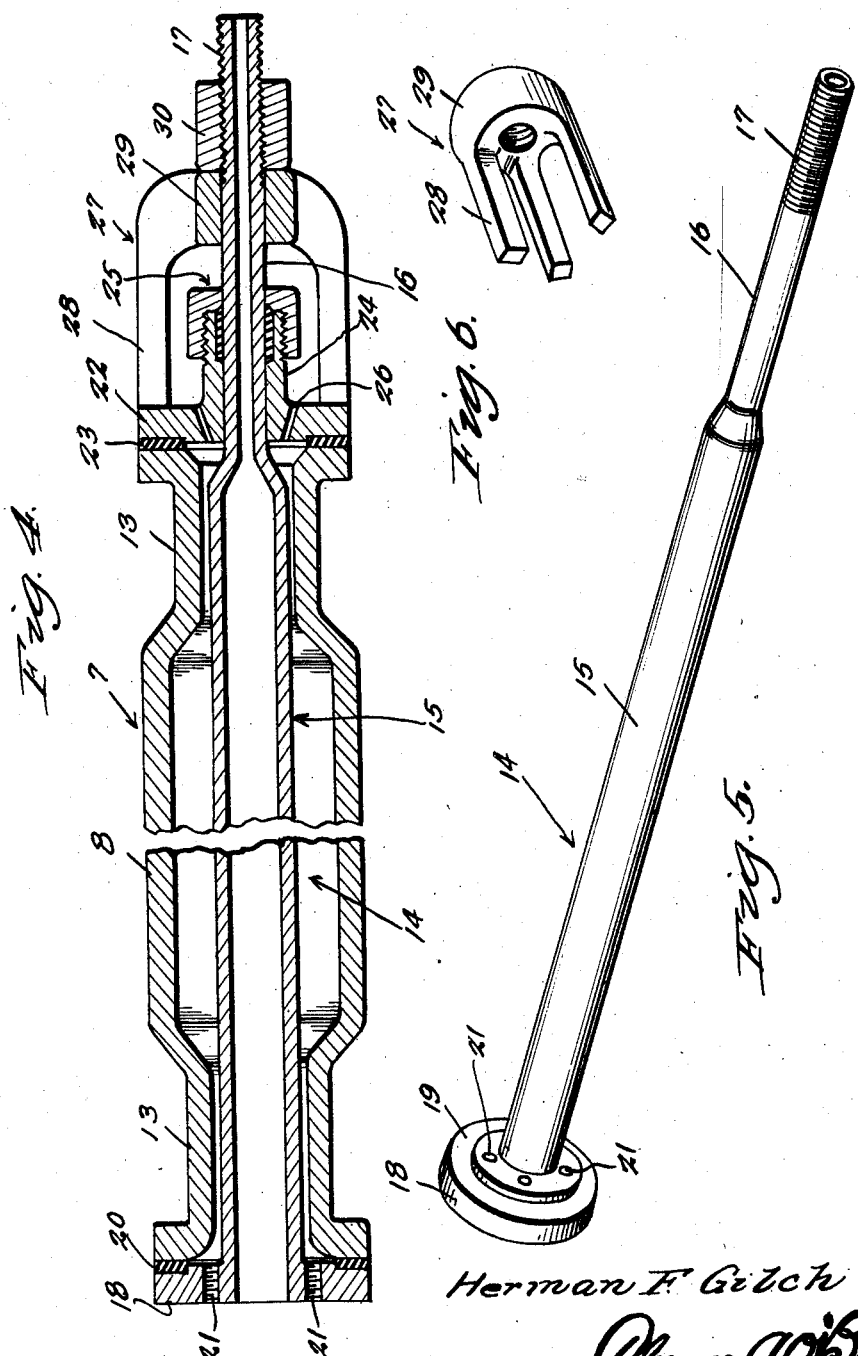
Inventor
Herman F. Gilch
By Clarence A. O'Brien
and Harvey B. Jacobson
Attorneys.

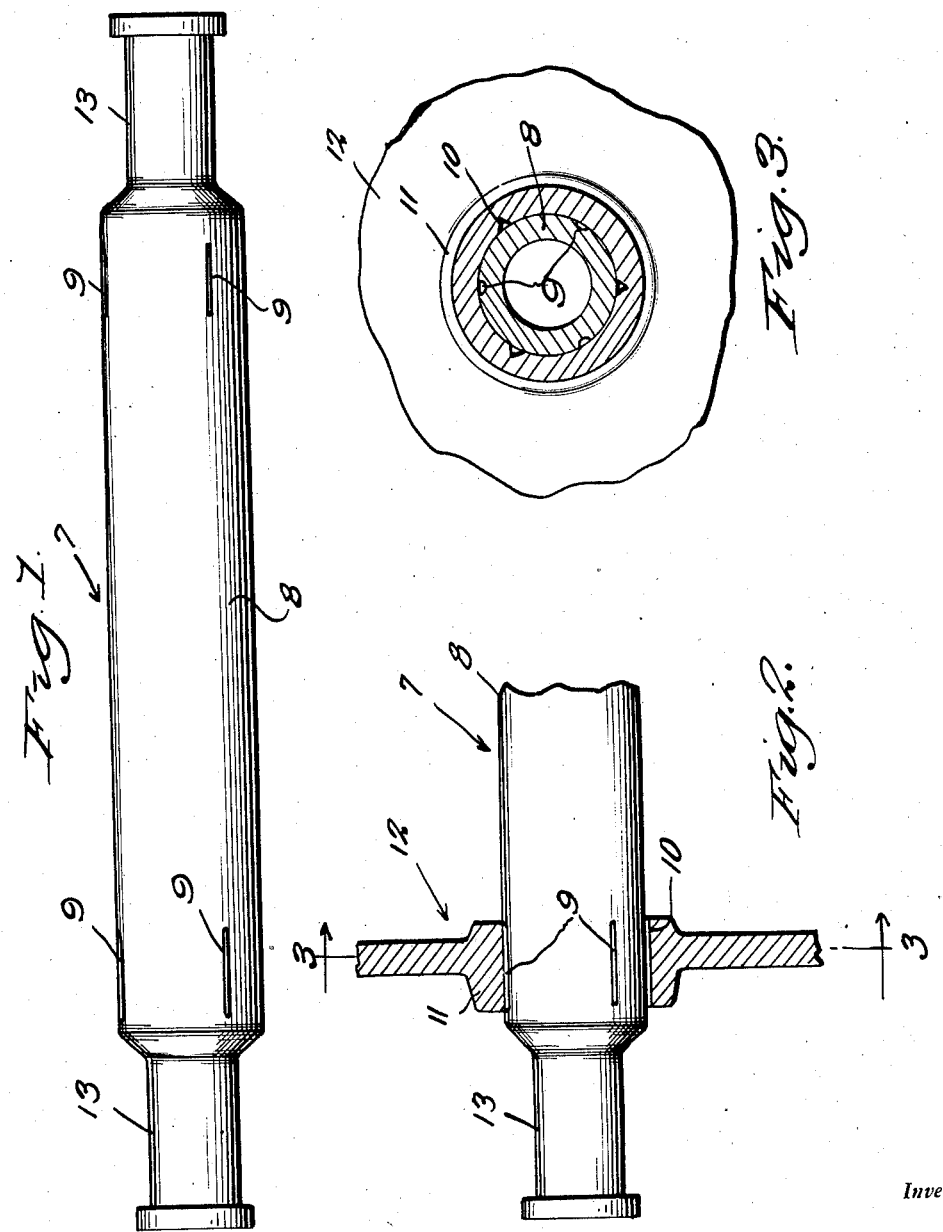

Patented May 7, 1946

2,399,864

UNITED STATES PATENT OFFICE 2,399,864

HOLLOW AXLE TESTING DEVICE

Herman F. Gilch, Duquesne, Pa., assignor of two-fifths to August J. Czudek, West Mifflin, Pa.

Application June 30, 1944, Serial No. 542,952

3 Claims. (Cl. 73—40)

This invention relates to a liquid type device for checking and testing tubular or hollow car wheel axles, this for purposes of uncovering and bringing to light dangerous fissures and cracks, particularly in the regions on which the car wheels are mounted.

Briefly, the preferred embodiment comprises a core-like insert, the latter constituting an adapter and being passed through and beyond the journals of the axle and having its end portions secured tightly to the outer ends of said journals, and having its exterior surface spaced from the interior of the axle so as to define a liquid-accommodation chamber between itself and the axle, whereby upon placing fluid under pressure in this space, any defects and fissures in the axle casting will be readily detected.

More specifically, novelty is predicated upon a quickly insertable and removable adapter in the form of an elongated hollow tube or rod having a head at one end and having its opposite end reduced and screw-threaded to accommodate a longitudinally shiftable packing gland unit and a tripod-like thrust and clamping device cooperable therewith.

Other features and advantages will become more readily apparent from the following description and the accompanying illustrative drawings.

In the drawings, wherein like numerals are employed to designate like parts throughout the views:

Figure 1 is an elevational view of a conventional hollow or tubular car wheel axle.

Figure 2 is a view showing one end of the axle and the fragmentary portion of the conventional car wheel thereon.

Figure 3 is a section taken approximately on the plane of the line 3—3 of Figure 2.

Figure 4 is a longitudinal sectional view showing the axle with the insertable and removable testing adapter therein.

Figure 5 is a perspective view of the adapter with certain of the accessories or parts removed.

Figure 6 is a perspective view of one of said parts.

Reference being had first to Figure 1, we here see a conventional car wheel axle 7 which is sometimes referred to as a tubular axle and in other instances as a hollow axle. It comprises the axle 8 proper which in accordance with my ideas is provided at its outer end portions with circumferentially spaced indentations forming seepage and leak detection grooves 9. These grooves coact with circumferentially spaced V-shaped seepage grooves or channels 10 which I provide in the hub 11 of the wheel 12. The axle is provided with the customary flanged journals 13 whose outer ends are open as shown in Figure 4. It is to be pointed out in this connection that the only additions which are provided are the seepage grooves 9 in the axle body and the seepage grooves 10 in the wheel hub. These are provided at such points to survey vital points at which frailties and fractures should be disovered as soon as possible. In other words, they are danger points and if leakages occur in such areas the grooves 9 and 10 facilitate detection more readily than would otherwise be the case. Primarily, however, I am concerned with the testing device shown in Figures 4, 5 and 6.

As before stated, the insertable and removable adapter device 14 is in the form of a longitudinally extending tubular core 15 of a length greater than that of the wheel axle. The right-hand end is reduced as at 16 to form a spindle and the outer end of this is screw-threaded as at 17. At the left-hand end said tube 15 is provided with a disk-like integral head 18 having a shouldered seat 19 for the packing ring 20 and provided with a plurality of circumferentially spaced screw-threaded inlet ports 21, these to accommodate nipples, pipes or special jet devices (not shown) for injecting the testing fluid, under pressure, between the adapter and the surrounding wheel axle.

The gasket 20 and head 18 provide a fluid-tight connection between the flanged wheel journal at the left. A similar arrangement is provided at the opposite end. This comprises a slidable follower disk 22 with a packing ring 23 thereon abutting the adjacent flanged journals. The disk is carried by a slidable hub 24 having a suitable packing gland 25. The disk is also provided with circumferentially spaced ports 26 to accommodate closing plugs or the like (not shown), these being the pressure release ports for bleeding air from the space between the adapter and surrounding wheel axle when the fluid under pressure is inserted through the intake ports 21 at the left. The tripod end thrust device 27 includes thrust fingers 28 engaging the follower disk 22, these fingers being integral with a hub-sleeve 29 which is pressed home by a clamping nut 30 on the threaded spindle 17.

The device is inserted from left to right as shown in Figure 4 with the follower disk 22 bearing against the adjacent flanged journal at the right end. As stated, this disk and packing thereon is pressed firmly in place through the medium of the nut 30 on the threaded part 17 and the intervening thrust device 27. This clamping action also presses the gasket 20 against the left-hand journal and thus the device is secured in place and ready for use.

Air which is trapped between the adapter and wheel axle is released through the orifices or ports 26, after which said ports are suitably closed. Then the penetrating oil or alcohol, which is used for testing purposes, is flooded between the adapter and wheel axle by way of appropriate injector devices connected to the ports 21. Any cracks or weak places or fissures will show up after sufficient pressure is provided.

This device can be used while the cars are in service. It is easily installed and removable and, it is submitted, fulfills the aims desired.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. As a new article of manufacture, a car wheel and axle assembly comprising a tubular open ended car wheel axle having a cylindrical body portion and reduced and end flanged journals at opposite ends of said body portion, said body portion adjacent said journals being provided with longitudinally extending circumferentially spaced testing fluid seepage and fissure exploring as well as detecting grooves, and standard car wheels mounted for operation on the end portions of the body portion, said car wheels having hubs and said hubs having internal circumferentially spaced seepage grooves, the latter coacting with said first-named grooves, whereby to bring to light cracks and blow-holes such as may exist at points in said body portion between the two mounted wheels.

2. In a car wheel axle, wheel and leakage-tester assembly, in combination, a hollow car wheel axle having a cylindrical body portion and reduced and end flanged journals projecting therebeyond, said body portion adjacent said journals being provided with longitudinally extending circumferentially spaced testing fluid seepage and fissure exploring and detecting grooves, conventional car wheels mounted for operation on the end portions of said body portion, said car wheels including hub portions having circumferentially spaced seepage grooves coacting, when properly lined up, with said first-named grooves, a core fitted temporarily in and extending from end to end of said axle, means for clamping the core against the journals at opposite ends of the axle, said core being concentrically spaced from the surrounding wall of the axle and defining a chamber to accommodate a testing medium, and means at one end of the core whereby the testing medium may be injected under pressure.

3. A fluid pressure type leakage detecting and testing device for a tubular car wheel axle comprising an elongated cylindrical hollow adapter rod having a fixed axle flange contacting head at one end, said head being provided with a gasket on its inner surface and being provided radially and inwardly of said gasket with a plurality of screw-threaded intake and supply ports for receiving testing fluid under pressure, the opposite end of said rod being reduced in diameter and externally screw-threaded, a follower comprising an apertured disk and a central hub including a stuffing box, said hub and stuffing box being slidably mounted on the reduced end portion of said rod, a clamping nut on the screw-threaded outer end of the reduced portion, and a thrust device interposed between the nut and disk on said follower, said thrust device being slidably mounted on the reduced portion of the rod.

HERMAN F. GILCH.